United States Patent [19]

Namiki

[11] Patent Number: 4,701,935
[45] Date of Patent: Oct. 20, 1987

[54] ONE FREQUENCY REPEATER FOR A DIGITAL MICROWAVE RADIO SYSTEM WITH CANCELLATION OF TRANSMITTER-TO-RECEIVER INTERFERENCE

[75] Inventor: Junji Namiki, Tokyo, Japan

[73] Assignee: NEC Corporation, Tokyo, Japan

[21] Appl. No.: 817,380

[22] Filed: Jan. 9, 1986

[30] Foreign Application Priority Data

| Jan. 9, 1985 | [JP] | Japan | 60-1642 |
| Jan. 9, 1985 | [JP] | Japan | 60-1654 |
| Jan. 9, 1985 | [JP] | Japan | 60-1655 |
| Mar. 27, 1985 | [JP] | Japan | 60-62414 |
| Mar. 27, 1985 | [JP] | Japan | 60-62415 |
| Mar. 27, 1985 | [JP] | Japan | 60-62416 |

[51] Int. Cl.⁴ .............................................. H04B 7/15
[52] U.S. Cl. ..................................... 375/4; 178/70 S; 178/71 R; 455/16; 455/21; 455/24
[58] Field of Search .................. 455/7, 15, 16, 19, 20, 455/24, 25, 60; 375/3, 4; 178/70 R, 70 S, 71 R; 342/361; 370/20

[56] References Cited

U.S. PATENT DOCUMENTS

| 2,425,315 | 8/1947 | Atwood et al. | 455/24 |
| 2,704,362 | 3/1955 | Bergan | 455/16 |
| 4,107,609 | 8/1978 | Gruenberg | 455/16 |
| 4,302,842 | 11/1981 | Huriau | 375/3 |
| 4,475,243 | 10/1984 | Bativala et al. | 455/24 |
| 4,475,246 | 10/1984 | Bativala et al. | 455/24 |

Primary Examiner—Benedict V. Safourek
Attorney, Agent, or Firm—Sughrue, Mion, Zinn, Macpeak & Seas

[57] ABSTRACT

A digital microwave radio repeater using the same carrier frequency for the transmitter and the receiver carriers for improving the frequency utilization efficiency. The transmitter-to-receiver interference signal is cancelled by producing an estimated-interference signal of the interference signal from the digital baseband signal by the use of a transversal filter and by subtracting the estimated-interference signal from the received signal. The estimated-interference signal is also produced by frequency shifting a digital modulated signal in the transmitter. The transmitter carrier frequency is locked to the receiver carrier frequency by the use of a phase-locking technique, so that the interference signal is reduced.

37 Claims, 12 Drawing Figures

ONE FREQUENCY REPEATER FOR A DIGITAL MICROWAVE RADIO SYSTEM WITH CANCELLATION OF TRANSMITTER-TO-RECEIVER INTERFERENCE

BACKGROUND OF THE INVENTION

1. Field of the Invention

The present invention relates to a repeating system for a digital radio wave transmission, and in particular, to the cancellation of transmitter-to-receiver interference at a repeater in a repeating system wherein carriers of the same frequency are used for both transmitter and receiver.

2. Description of the Prior Art

In a digital radio wave transmission system, a carrier, usually a microwave modulated by the digital baseband signal to be transmitted, is transmitted as a digital microwave radio signal. A repeater used in the digital microwave transmission system has at least one and, usually two repeating paths. Each repeating path comprises a pair of receiving and transmitting antennas. The digital microwave is received at the receiving antenna and is demodulated. The demodulated signal is applied to a decision circuit, which and regenerates the digital baseband signal. A carrier is modulated by the regenerated digital baseband signal at a transmitter, and the digital microwave signal is radiated from the transmitting antenna.

The receiving antenna of one repeating path and the transmitting antenna of the other path are mounted side by side on the front face of the repeater, while the transmitting antenna of the one repeating path and the receiving antenna of the other are arranged side by side on the opposite back face of the repeater.

In the repeater, signals transmitted from the two transmitting antennas may interfere with the desired signal received at each receiving antenna, due to the side-to-side and front-to-back antenna couplings.

In order to avoid such transmitter-to-receiver interference, a conventional repeating system uses a pair of different transmitting and receiving carrier frequencies in all hops over and over again. This system is called two frequency plan repeating system.

From the view point of frequency utilization efficiency, the two frequency repeating system is inferior to a single-frequency repeating system where the same frequency carrier pair is used for both transmitting and receiving carriers in common for all hops, although a cochannel dual polarization system has been used for various digital microwave radio systems.

In order to realize a single frequency repeating system, the transmitter-to-receiver interference must be eliminated. In this instance, the necessary bandwidth may be substantially reduced.

SUMMARY OF THE INVENTION

It is an object of the present invention to provide a digital radio wave repeater of a one frequency type wherein the same carrier frequency is used for the transmitting and receiving carriers to thereby improve the frequency utilization efficiency.

It is another object of the present invention to provide a one frequency repeater where any transmitter-to-receiver interference can be effectively eliminated.

It is still another object of the present invention to provide a one frequency repeater where the transmitting carrier frequency can be equalized to the receiving carrier frequency to thereby improve the reliability of the cancellation of the transmitter-to-receiver interference signal.

The one frequency repeater according to the present invention is used in a digital radio wave transmission system wherein a carrier is modulated by a digital baseband signal and is transmitted as a digital radio wave. The repeater comprises transmitter circuit means for producing a first digital radio wave signal modulated by a first digital baseband signal. The first digital radio wave has a first carrier frequency. The first digital radio frequency signal is radiated from the transmitting antenna means. The repeater further comprises receiving antenna means for receiving a second digital radio wave signal modulated by a second digital baseband signal. The second digital radio wave signal has a second carrier frequency substantially equal to the first carrier frequency. The receiving antenna means receives the first digital radio wave signal as a transmitter-to-receiver interference signal due to the coupling between the first transmitting antenna means and the first receiving antenna means. The repeater comprises receiver circuit means for extracting the second digital baseband signal by demodulating the second radio wave signal received at the receiving antenna. The demodulated second digital baseband signal is accompanied with by a baseband interference signal derived from the transmitter-to-receiver interference signal. The repeater comprises means for producing an estimated-interference signal corresponding to the baseband interference signal from the first digital baseband signal and interference cancelling means for cancelling the baseband interference signal from an output signal of the receiver circuit means using said estimated interference signal. The first subtracting means outputs the demodulated second digital baseband signal without the baseband interference signal.

The estimated-interference signal producing means is a transversal filter means comprising a delay line with a predetermined number of tap gains.

The one frequency repeater further comprises decision circuit means for discriminating the second digital baseband signal from an output of the interference cancelling means and regenerating the second digital baseband signal, and tap gain control means. The tap gain control means comprises first subtracting means for subtracting the regenerated second digital baseband signal from the output signal of the interference cancelling means and providing an error signal, multiplier means for multiplying the first digital baseband signal by the error signal and providing a multiplied signal, and low-pass filter means for smoothing the multiplied signal. The smoothed multiplied signal is supplied to the transversal filter means to control the tap gains so that the error signal is zero.

In another aspect of the present invention, the transmitter circuit means includes variable frequency oscillator means for fine adjusting the first carrier frequency. The variable frequency oscillator means is controlled by an output signal of the first multiplier means so that the first carrier frequency is made equal to the second carrier frequency.

In still another aspect of the present invention, the estimated-interference signal is produced by frequency shifting the first digital baseband signal or a digital intermediate frequency signal by an amount corresponding to a frequency difference between the transmitter and the receiver carrier frequencies.

In another aspect, the transmitter circuit means has first variable intermediate frequency oscillator means for providing a first intermediate frequency signal, modulating means for modulating the first intermediate frequency signal by the first digital baseband signal, and frequency-up converter means for converting the first intermediate frequency of the modulated signal to the first carrier frequency and producing the first digital radio wave signal. The receiver circuit means has frequency-down converter means for converting a second digital radio wave signal received at the receiving antenna means to a down-converted signal having a second intermediate frequency, second variable intermediate frequency oscillator means for providing a second intermediate frequency signal, and demodulating means for demodulating the down-converted signal by the second intermediate frequency signal and providing a demodulated signal. The repeater further comprises means for detecting from the demodulated signal a phase difference between the down-converted signal and the second intermediate signal, the second variable intermediate frequency oscillator means being controlled by the phase difference, and phase comparator means for phase-comparing the second intermediate signal and the first intermediate signal and providing an error signal. The error signal is applied to the first variable intermediate oscillator means so that the first intermediate frequency signal is phase-locked to the second intermediate signal.

Further objects, features and other aspects will be understood from the following detailed description of preferred embodiments of the present invention with respect to the accompanying drawings.

DETAILED DESCRIPTION OF PREFERRED EMBODIMENTS

Prior to description of embodiments of the present invention, a description will be made of the conventional two frequency repeating system and the fundamental concept of the present invention.

Figure 1:
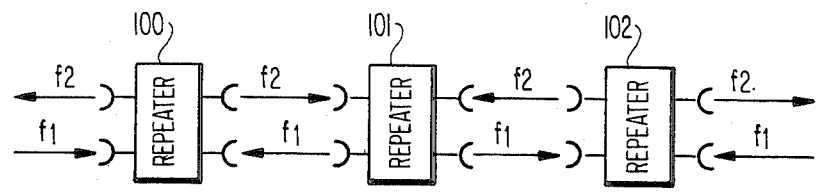
FIG. 1 is a schematic view illustrating a conventional two frequency repeating system.

Referring to FIG. 1, the conventional two frequency repeating system is depicted for a multi-hop two-way microwave radio. In this system, the carrier frequency of a digital microwave signal received at the repeater is different from that of the digital microwave signal transmitted therefrom, so that the digital microwave signal transmitted from the repeater cannot be received at any receiver in the same repeater. As illustrated, a received carrier frequency $f_2$ and a transmitted carrier frequency $f_1$ at are present repeater 101, whereas a received carrier frequency $f_1$ and a transmitted carrier frequency $f_2$ are present at the next repeater 100 or 102.

Therefore, the two frequency repeating system is advantageous in that it reduces the transmitter-to-receiver interference. However, it is disadvantageous in frequency utilization efficiency because the allowable frequency band must be divided into transmission and the receiving bands.

Figure 2:
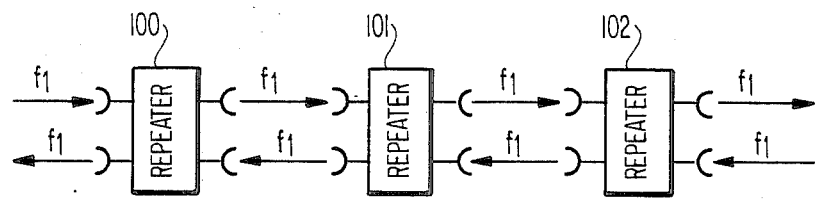
FIG. 2 is a schematic view illustrating a one frequency repeating system.

Referring to FIG. 2, the one frequency repeating system uses the same frequency $f_1$ for the transmitted carrier and the received carrier in each repeater 100-102. However, the carrier frequencies do not coincide with each other but have an inevitable small frequency difference in actual use because of various reasons. For example, the frequency sources are different. Therefore, the carrier frequencies are represented by different notations $f_{11}$, $f_{12}$, $f_{13}$ and $f_{14}$ in FIG. 3.

Figure 3:
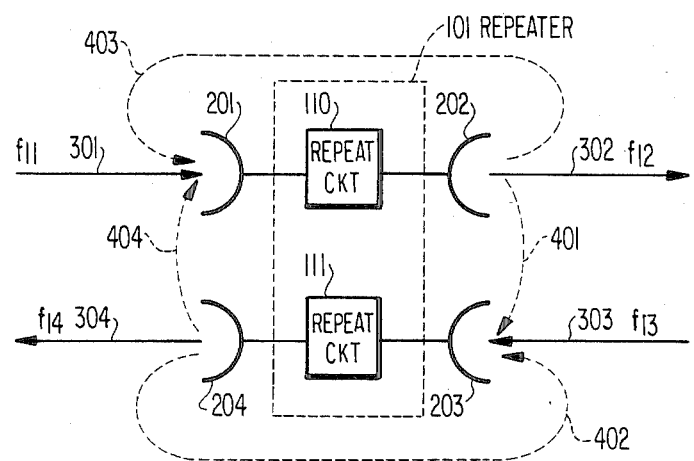
FIG. 3 is a schematic view illustrating various transmitter-to-receiver interferences at the repeater in the one frequency repeating system.

Referring to FIG. 3, each repeater (represented at 101) in the one frequency repeating system includes a first repeating path comprising a receiving antenna 201, a regenerative repeating circuit 110, and a transmitting antenna 202. Thus, a digital microwave signal 301 of a carrier frequency $f_{11}$ received at the receiving antenna 201 is repeated by the first repeating path and transmitted from the transmitting antenna 202 as a digital microwave signal 302 of a carrier frequency $f_{12}$ which is substantially equal to the frequency $f_{11}$. Another second opposite directional repeating path of the repeater 101 similarly comprises a receiver antenna 203, regenerative repeating circuit 111, and a transmitting antenna 204. The receiving antenna 203 and the transmitting antenna 204 are arranged adjacent the transmitting antenna 202 and the receiving antenna 201, respectively. The second repeating path repeats a digital microwave signal 303 of a carrier frequency $f_{13}$ which is substantially equal to the carrier frequency $f_{12}$ as a signal 304 of a carrier frequency $f_{14}$ which is substantially equal to the frequency $f_{13}$.

Since the microwave signals 302 and 304 transmitted from transmitting antennas 202 and 204 have a substantially equal carrier frequency to the desired signal 303 received at receiving antenna 203, a part of the signal 302 is received as an interference signal 401 at repeating circuit 111 due to the side-to-side coupling between transmitting antenna 202 and receiving antenna 203. A part of the signal 304 transmitted by antenna 204 forms another interference signal 402 due to the front-to-back coupling between transmitting antenna 204 and receiving antenna 203. When the desired signal 303 is demodulated to obtain the baseband signal at a demodulator in the repeating circuit 111, the interference signals 401 and 402 are also demodulated to generate respective baseband signals, which interfere with the desired baseband signal.

Another part 403 of the signal 302 and another part 404 of the signal 304 also form interference signals with the desired signal 301 received at antenna 201, due to the front-to-back coupling between antennas 202 and 201 and the side-to-side coupling between antennas 204 and 201.

Figure 4:
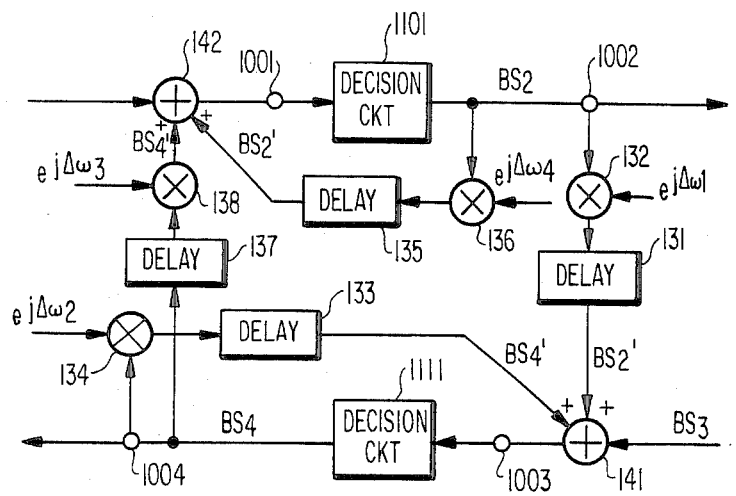
FIG. 4 is a view illustrating an equivalent circuit for the baseband of the repeater of FIG. 3.

Referring to FIG. 4, an equivalent circuit of the repeater is illustrated.

In a condition where there is no interference, a desired baseband signal $BS_1$ is applied to a decision circuit 1101 through a terminal 1001 corresponding to the receiving antenna (201 in FIG. 3) and is regenerated or reproduced as a baseband signal $BS_2$. The regenerated baseband signal $BS_2$ is supplied to a terminal 1002 corresponding to the transmitting antenna (202 in FIG. 3). Similarly, another desired baseband signal $BS_3$ is regenerated as a baseband signal $BS_4$ at a decision circuit 1111, which is supplied to a terminal 1004 corresponding to the transmitting antenna (204 in FIG. 3). Terminal 1003 corresponds to the receiving antenna (203 in FIG. 3).

However, in the actual use, an interference signal 401 is added to the desired signal 303 due to the side-to-side coupling, as described above. Therefore, baseband signal $BS_2$ is added to the desired baseband signal $BS_3$ as a baseband interference signal $BS_2'$ with a delay time corresponding to the transfer period of the interference signal 401 from antenna 202 to antenna 203 and with a phase rotation corresponding to the small frequency difference between the transmitter carrier frequency $f_{12}$ and the receiver carrier frequency $f_{13}$. The angular velocity of the phase rotation is represented by $\Delta\omega_1$.

The delay time and phase rotation are illustrated by a delay circuit 131 and a multiplier 132 in FIG. 4.

Similarly, the baseband signal $BS_4$ is also added to the desired baseband signal $BS_3$ as another baseband interference signal $BS_4'$ due to the front-to-back coupling between antennas 203 and 204. The similar delay and phase rotation are illustrated by a delay circuit 133 and a multiplier 134.

Addition of $BS_2'$ and $BS_4'$ to $BS_3$ is illustrated by an adder 141 in FIG. 4.

It will be appreciated that baseband signals $BS_2$ and $BS_4$ are added to another desired baseband signal $BS_1$ at an adder 142 as baseband interference signals $BS_2''$ and $BS_4''$ through similar equivalent circuits comprising delay circuits 135 and 137 and multipliers 136 and 138, as shown in FIG. 4.

Since the frequency differences between the transmitter carrier frequencies $f_{12}$ and $f_{14}$ and the receiver carrier frequencies $f_{11}$ and $f_{13}$ are different from one another, the angular velocities of the phase rotations of the baseband interference signals are different from one another. Therefore, respective angular velocities are represented by $\Delta\omega_1 - \Delta\omega_4$ in FIG. 4.

Providing that $\Delta\omega_1 - \Delta\omega_4$ are represented by $\Delta\omega_i$ and that the symbol rate of the baseband signal is represented by S.R., the following formula (1) usually holds:

$$\Delta\omega_i << S.R. \qquad (1)$$

From the above description in connection with FIG. 4, it will be appreciated that the transmitter-to-receiver interference in a repeater of a one frequency repeating system can be cancelled by producing a quasi baseband interference signal similar to an actual baseband interference signal, and by subtracting the estimated-interference baseband interference signal from the output signal of a demodulator in the receiver.

This is the fundamental concept of the present invention.

Figure 5:
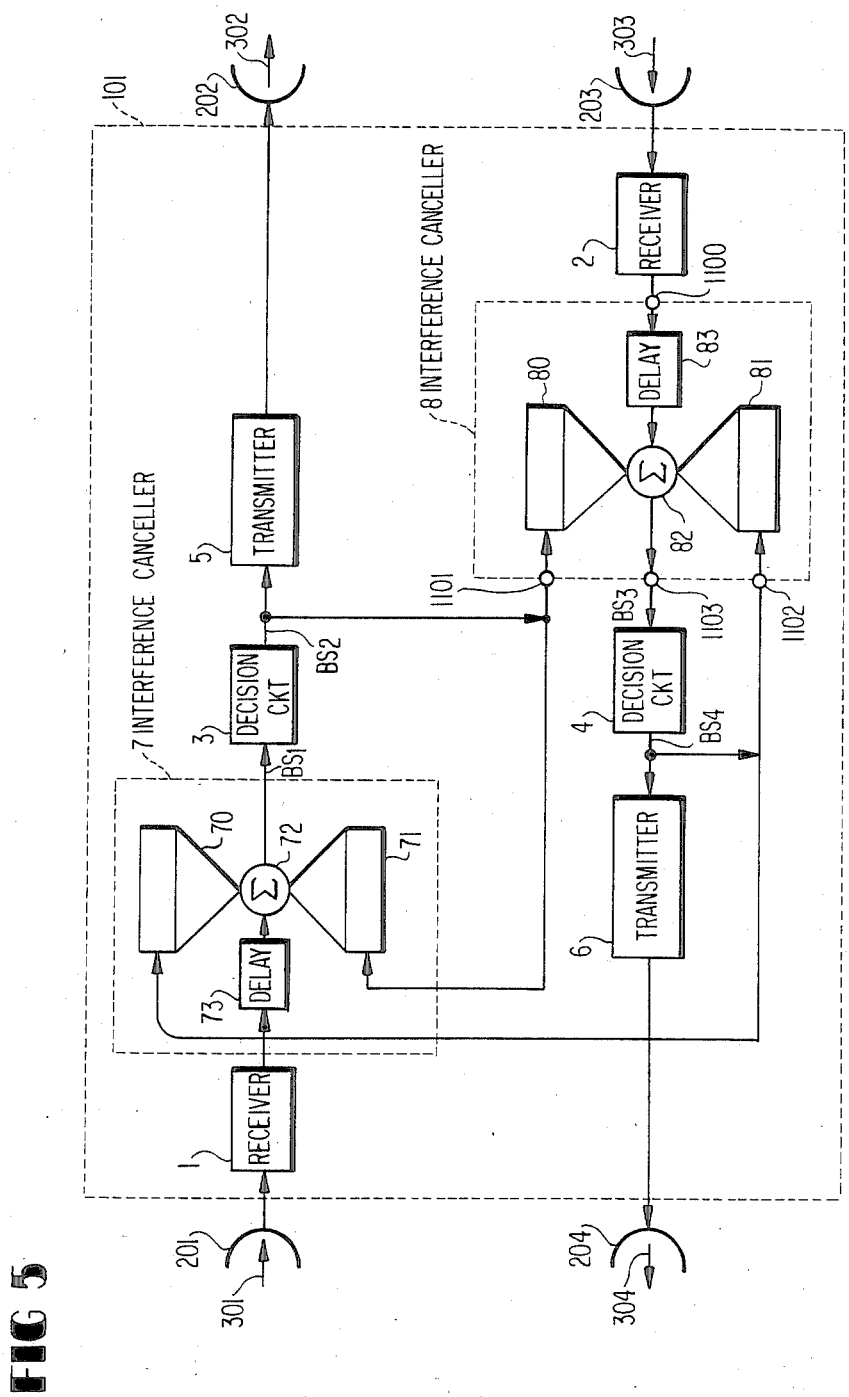
FIG. 5 is a block circuit diagram of a repeater according to an embodiment of the present invention.

Referring to FIG. 5, a repeater 101 according to an embodiment of the present invention comprises two opposite directional repeating paths. Each repeating path comprises a receiving antenna 201, 203, a receiver circuit 1 and 2, a decision circuit 3, 4, transmitter circuit 5, 6, and a transmitting antenna 202, 204.

Receiver circuits 1 and 2 comprise demodulators for demodulating signals received at antennas 201 and 203 to obtain baseband signals which are carried by the microwave radio signals 301 and 302, respectively.

For each receiver circuit 1, 2, a known digital radio receiver circuit is used, which usually includes two frequency-down converters, one being a down converter from a radio frequency (RF) to an intermediate frequency (IF) and the other being one from IF to the baseband.

Decision circuits 3 and 4 detect the baseband signals applied thereto and regenerate or reproduce the baseband signals, respectively. The decision circuit is also known in the prior art.

Transmitter circuits 5 and 6 are for generating digital microwave signals from the carrier and the baseband signals, and comprise digital demodulators. The transmitter circuit is also known in the prior art, and usually includes two frequency-up converters, one being a baseband to IF converter and the other being an IF to RF converter.

According to the present invention, the repeater 101 of FIG. 5 further comprises two interference cancellers 7 and 8.

The interference canceller 7 is for removing the baseband interference signals ($BS_2''$ and $BS_4''$ in FIG. 4) due to the interference signals (403 and 404 in FIG. 3) from the demodulated output signal of receiver circuit 1, while the other interference canceller 8 is for removing the baseband interference signals ($BS_2'$ and $BS_4'$ in FIG. 4) from the demodulated output signal of receiver circuit 2.

The interference canceller 7 comprises two estimated-interference signal producing circuits 70 and 71 and a subtractor 72. The estimated-interference signal producing circuit 70 produces an estimated-interference signal of the baseband interference signal $BS_4''$ from the output baseband signal $BS_4$ of decision circuit 4. Another estimated-interference signal producing circuit 71 produces an estimated-interference signal corresponding to the baseband interference signal $BS_2''$ from the output baseband signal $BS_2$ of decision circuit 3. The subtractor 72 subtracts the two estimated-interference signals from the output signal of receiver circuit 1. Thus, the baseband interference signals $BS_4''$ and $BS_2''$ are removed from the output signal of receiver circuit 1, and the desired baseband signal $BS_1$ is applied to the decision circuit 3.

The other interference canceller 8 also comprises two estimated-interference signal producing circuits 80 and 81 for producing estimated-interference signals corresponding to the baseband interference signals $BS_2'$ and $BS_4'$ from the output baseband signals $BS_2$ and $BS_4$ of decision circuits 3 and 4, respectively. The estimated-interference signals are applied to a subtractor 82 and are subtracted thereat from the output signal of receiver circuit 2. Thus, the desired baseband signal $BS_3$ is applied to decision circuit 4 without the baseband interference signals $BS_2'$ and $BS_4'$.

The estimated-interference signal producing circuit 80 is a circuit having a characteristic equal to an equivalent circuit of delay circuit 131 and multiplier 132 in FIG. 4.

Referring to FIG. 4 again, the multiplier 132 can be replaced by a complex coefficient multiplier of a type wherein the coefficient changes slowly, because $\Delta\omega_1$ meets formula (1), and can be considered as a complex constant coefficient multiplier for a short time period.

Therefore, the estimated-interference signal producing circuit 80 can be composed of a filter such as a transversal filter.

Figure 6:
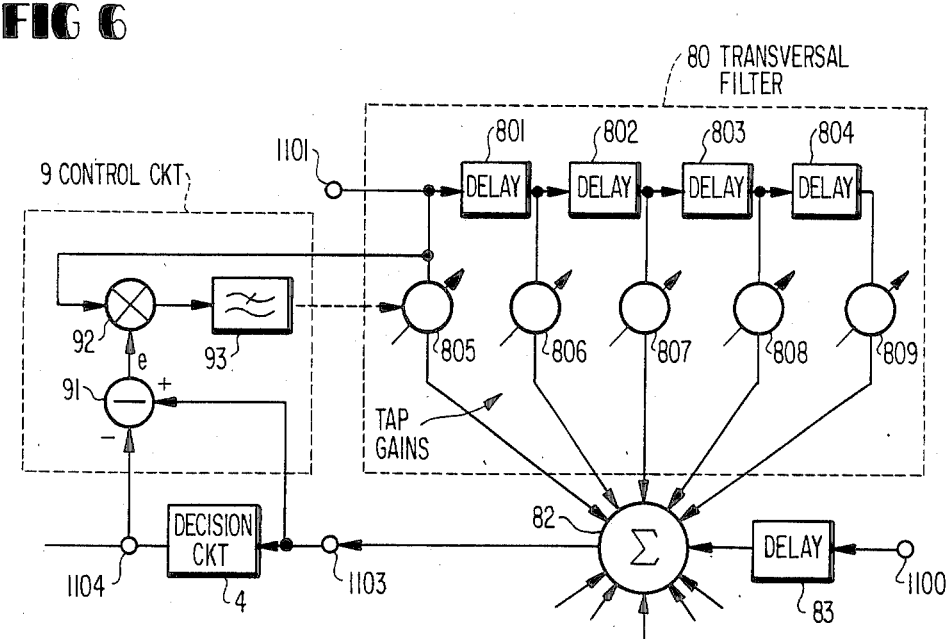
FIG. 6 is a block circuit diagram of an example of an estimated-interference signal producing circuit.

FIG. 6 shows an embodiment of the estimated-interference signal producing circuit 80 composed of a transversal filter or a delay line with tap gains. The transversal filter 80 comprises four T-second delay circuits 801-804 and five tap gain 805-809. The delay time T is determined to be a value of 1/R.S. or less (R.S. is the symbol rate as described above). The determination of the number of taps is made on a case-by-case calculation. The baseband signal $BS_2$ is applied to an input terminal 1101 of the transversal filter 80.

Generally speaking, the filtering characteristic of the transversal filter can be changed by control of the tap gains. In the embodiment shown, the transversal filter 80 is accompanied by a control circuit 9 in order to control the tap gains 805-809 according to an adaptive control technique.

The control circuit 9 comprises a substractor 91, a multiplier 92 and a low-pass filter (LPF) 93. The subtractor 91 subtracts the output signal of decision circuit 4 from the input signal of the decision circuit and produces an error signal e representing the difference between the output and input signals. The error signal e is multiplied at multiplier 92 by the baseband signal $BS_2$ from the output of the decision circuit 3. The multiplied output passes through LPF 93 and is thereafter applied to tap gains 805-809 to control the gains. A signal representative of the sign of the error signal may be applied to the multiplier 92 in place of the error signal e itself. Also, a signal representative of the sign of the baseband signal $BS_2$ may be applied to the multiplier 92 in place of the signal $BS_2$ itself.

The error signal e represents the baseband interference signal $BS_2'$ caused by the coupling between antennas 202 and 203 and has a strong or close correlation with the baseband signal $BS_2$. The correlation between the error signal and the baseband signal is detected by the multiplier 92. The tap gains 805-809 are controlled by the detected correlation through LPF 93 so that the correlation is made zero. Thus, the estimated-interference signal similar to the baseband interference signal $BS_2'$ can be obtained as the output signal of the transversal filter 80. The estimated-interference signal is subtracted at subtractor 82 from the demodulated output signal of receiver circuit 2. Thus, the baseband interference signal $BS_2'$ is removed from the demodulated output signal of receiver circuit 2. Terminals 1100, 1101, 1103 and 1104 in FIG. 6 are the terminals represented by the same reference numerals in FIG. 5.

Each of the other estimated-interference signal producing circuits 70, 71 and 81 is also provided with a transversal filter and a control circuit similar to those in FIG. 6.

In FIG. 6, delay circuits 73 and 83 are for adjusting the relative times between the output signal of receiver circuit 1 and the output signals of transversal filters 70 and 71 and between the output signal of receiver circuit 2 and the output signals of transversal filters 80 and 81.

The embodiment of FIG. 5 is arranged to cancel all of the transmitter-to-receiver interferences (401-404 in FIG. 3) due to the side-to-side and front-to-back antenna couplings. However, if any one of the interference signals 401 and 402 is of low power so that it can be ignored in comparison with the desired received signal 303, the estimated-interference signal producing circuit 80 or 81 corresponding to the low-power interference signal can be omitted. The estimated-interference signal producing circuit 70 or 71 can also be omitted in a similar condition.

Figure 8:
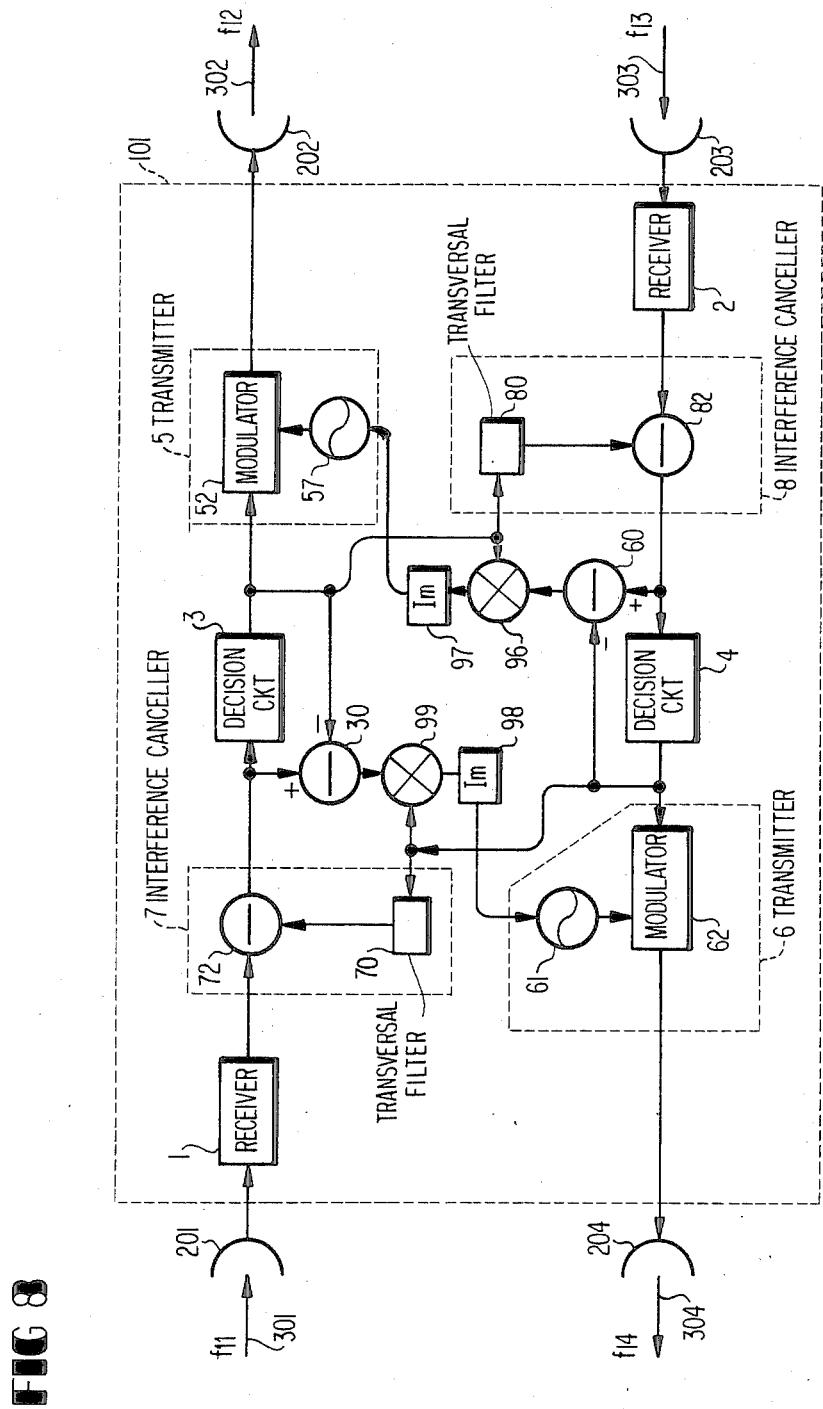
FIG. 8 is a block circuit diagram of a repeater according to still another embodiment of the present invention.

Generally speaking, the front-to-back antenna coupling is lower than the side-to-side antenna coupling and therefore, estimated-interference signal producing circuits 71 and 81 can be omitted, as shown in FIG. 8.

In the usual microwave radio transmission system, cochannel dual polarization transmission is used wherein two digital baseband signals are carried on a pair of orthogonally related polarized waves by a, so-called, quadrature-amplitude modulation (QAM) technique.

The present invention can be applied to a one frequency repeater in the cochannel dual polarization transmission system.

Figure 7:
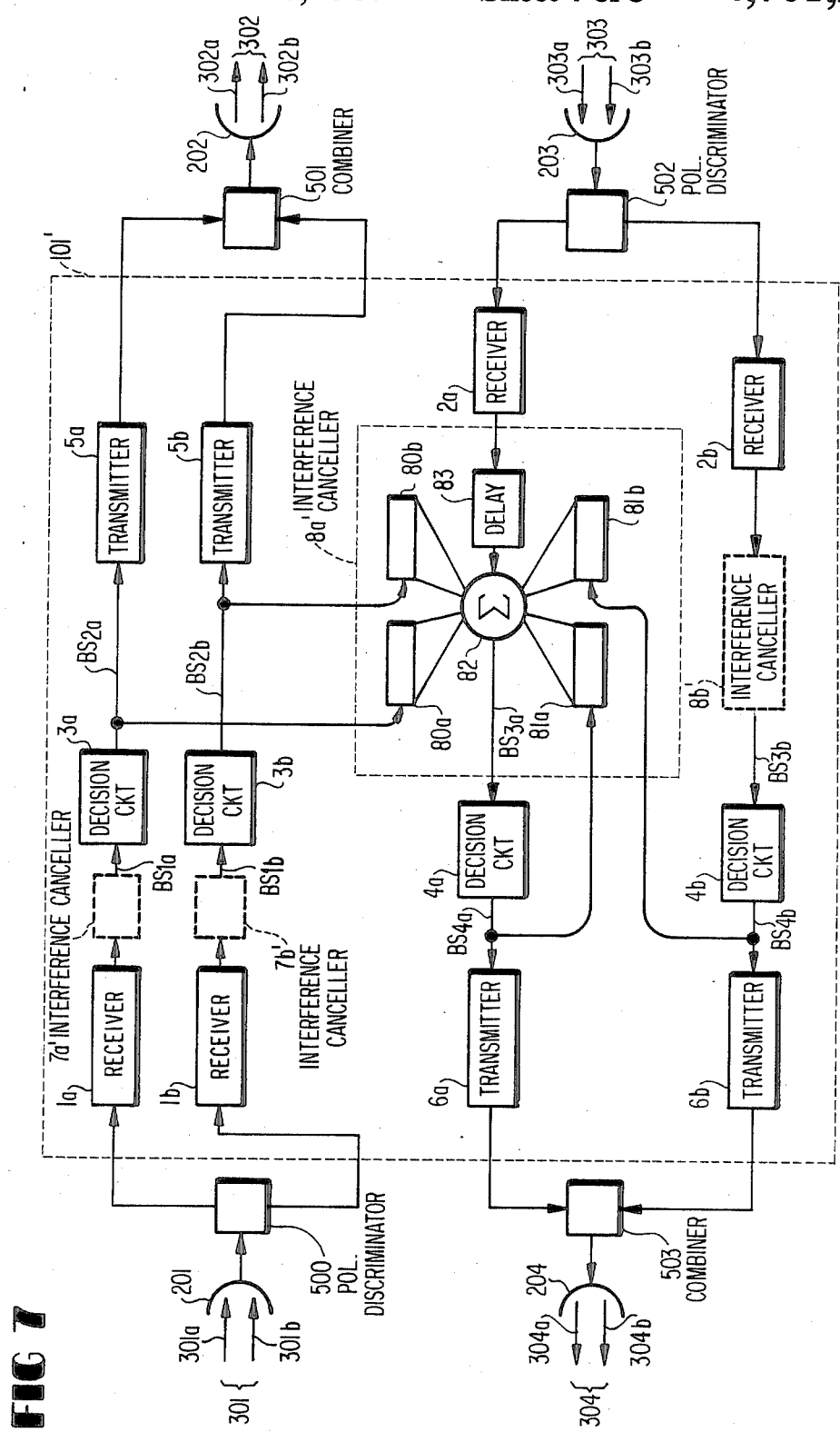
FIG. 7 is a block circuit diagram of a repeater according to another embodiment of the present invention.

Referring to FIG. 7, the repeater 101 shown therein is used in the cochannel dual polarization transmission system and comprises two pairs of receiving and transmitting antennas 201-202 and 203-204.

A microwave radio signal 301 of frequency $f_{11}$ comprises a vertically polarized (V-pol) signal $301a$ and a horizontally polarized (H-pol) signal $301b$. After the radio signal 301 is received at receiving antenna 201, the received signal is separated at a polarization discriminator 500 into the V-pol signal and the H-pol signal. The V-pol signal is applied to a repeating path comprising a receiver $1a$, a decision circuit $3a$ and a transmitter circuit $5a$. A baseband signal $BS_{1a}$ is extracted from the V-pol signal and is regenerated as a baseband signal $BS_{2a}$, which is carried on a carrier of frequency $f_{12}$ to reproduce the V-pol signal.

In a similar repeating path including a receiver circuit $1b$, a decision circuit $3b$ and a transmitter circuit $5b$, a baseband signal $BS_{1b}$ is extracted from the H-pol signal and an H-pol signal of a carrier frequency $f_{12}$ is reproduced. The reproduced H-pol signal carries a regenerated baseband signal $BS_{2b}$.

The reproduced V-pol signal and H-pol signal are combined at a cross-polarization combiner 501, and the combined signal is radiated from the transmitting antenna as a microwave radio signal 302 comprising a V-pol component $302a$ and an H-pol component $302b$.

Another mirowave radio signal 303 of a frequency of $f_{13}$ comprising cross-polarized waves $303a$ and $303b$ is received at antenna 23 and is processed through a polarization discriminator 502, two repeating paths, and a combiner 503 in a manner similar to the above-described processing the microwave radio signal 301. That is, the V-pol signal is processed through a repeating path comprising a receiver circuit $2a$, a decision circuit $4a$ and a transmitter circuit $6a$ so that a baseband signal $BS_{3a}$ carried on the V-pol signal is regenerated as a baseband signal $BS_{4a}$ and is carried on a V-pol signal of a carrier frequency $f_{14}$. On the other hand, a baseband signal $BS_{3b}$ is extracted from the H-pol signal and is regenerated as a baseband signal $BS_{4b}$ which is carried on an H-pol signal of the same frequency carrier. The V-pol signal and the H-pol signal carrying the baseband signals $BS_{4a}$ and $BS_{4b}$ are combined at combiner 12 and are radiated from transmitter antenna 204 as a microwave radio signal 304 comprising a V-pol and an H-pol component 304a and 304b.

In the repeater, the microwave radio signals 302 and 304 are input to both receiver circuits 2a and 2b through receiver antenna 203 and discriminator 11 as interference signals (401 and 402 in FIG. 3) due to the side-to-side and front-to-back antenna couplings. Accordingly, baseband signals $BS_{2a}$, $BS_{2b}$, $BS_{4a}$ and $BS_{4b}$ are interference signals with respect to the desired baseband signal $BS_{3a}$.

A transmitter-to-receiver interference canceller 8'a is provided between the receiver circuit 2a and decision circuit 4a. The canceller 8'a comprises four estimated-interference signal producing circuits 80a, 80b, 81a and 81b and a subtractor 82. The estimated-interference signal producing circuits 80a–81b produce estimated-interference signals similar to baseband interference signals $BS'_{2a}$, $BS'_{2b}$, $BS'_{4a}$ and $BS'_{4b}$ based on baseband signals $BS_{2a}$, $BS_{2b}$, $BS_{4a}$ and $BS_{4b}$, respectively. Each estimated-interference signal producing circuit of 80a–81b can include a transversal filter and a control circuit in the manner of FIG. 6.

Similar transmitter-to-receiver interference cancellers 7a', 7b', and 8b' are provided between receiver circuits and decision circuits 1a–3a, 1b–3b and 2b–4b, respectively.

Thus, desired baseband signals $BS_{1a}$, $BS_{1b}$, $BS_{3a}$ and $BS_{3b}$ are applied to decision circuits 3a, 3b, 4a and 4b, without baseband interference signals.

In this embodiment, it is also possible to omit any estimated-interference signal producing circuit corresponding to an interference signal having an ignorably low power.

In the above-described embodiments, it is assumed that the carrier frequencies $f_{11}$–$f_{14}$ are substantially equal to one another so as to meet formula (1). If formula (1) is not met, the transmitter-to-receiver signal cannot be cancelled.

Referring to FIG. 8, another embodiment shown therein is similar to the embodiment of FIG. 5 except for the provision of a circuit means for adjusting the transmitting carrier frequency so as to allow the satisfaction of formula (1). Further two estimated-interference signal producing circuits 71 and 81 are omitted assuming that the front-to-back antenna coupling is ignorable.

Similar parts are represented by the same reference numbers in FIG. 5, and a detailed description thereof is omitted.

Transmitter circuits 5 and 6 have carrier sources comprised of variable frequency oscillators 57 and 61, respectively. Modulators are shown at 52 and 62.

Subtractors 60 and 30, which correspond to subtractor 91 in FIG. 6, are connected across decision circuits 3 and 4, respectively. The output error signals e of subtractors 60 30 are supplied to multipliers 96 and 99 which correspond to the multiplier 92 in FIG. 6. 97 and 98 represent complex output terminals of multipliers 96 and 99. Output signals from the complex output terminals 97 and 98 are applied to variable frequency oscillators 51 and 61, respectively.

Now, providing that the delay circuits 131 and 137 in FIG. 4 are ignorable, the error signal e of each subtractor 30, 60 is given by the following equation (2):

$$e = a \cdot D \cdot \exp(j \cdot \Delta\omega) \qquad (2),$$

where $\alpha$ is the amount of the transmitter-to-receiver interference, D is a baseband signal which is a source of the interference signal, and $\Delta\omega$ is a phase difference between the transmitting and the receiving carrier frequencies $f_{11}$–$f_{14}$ or $f_{12}$–$f_{13}$.

Therefore, the complex output T of each multiplier 96 or 99 is given by:

$$T = I_m\{e \cdot D^*\} \qquad (3)$$
$$= I_m\{a \cdot D \cdot \exp(j \cdot \Delta\omega) \cdot D^*\}$$
$$= \alpha|D|^2 \sin(\Delta\omega),$$

where $D^*$ is a complex conjugate.

It is appreciated from equation (3) that output signals from terminals 97 and 98 represent phase differences between transmitting carriers $f_{12}$ and $f_{14}$ and receiving carriers $f_{13}$ and $f_{11}$, respectively.

Therefore, variable frequency oscillators 57 and 61 are adjusted by the output signals from terminals 97 and 98, so that the transmitter carrier frequencies $f_{12}$ and $f_{14}$ are locked to the receiver carrier frequencies $f_{13}$ and $f_{14}$. Accordingly, $\Delta\omega$ is made nearly equal to zero, that is, formula (1) is fulfilled. Thus, cancellation of the transmitter-to-receiver interference can be carried out.

The subtractors 30 and 60 and multipliers 96 and 99 can be used commonly used with those in the control circuits (9 in FIG. 6) of the transversal filters 71 and 80, but can be additionally provided.

Figure 9:
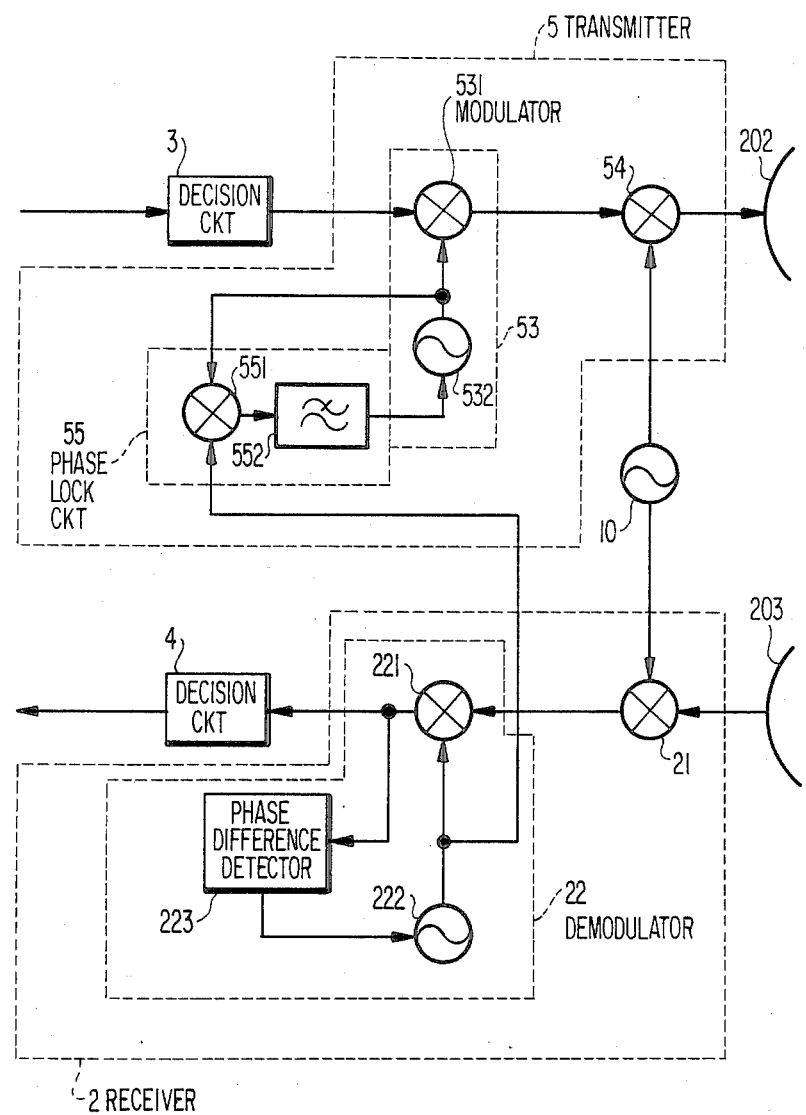
FIG. 9 is a block circuit diagram of a part of the embodiment of FIG. 8.

FIG. 9 shows another circuit arrangement for adjusting the transmitter carrier frequency to the receiver carrier frequency.

Referring to FIG. 9, similar parts are represented by the same reference numerals as in FIG. 5. The receiver circuit 2 includes a frequency-down converter comprising a multiplier 21 and a fixed frequency oscillator 10. The microwave signal received at antenna 203 is frequency converted to an intermediate frequency (IF) by the frequency-down converter. The frequency converted signal is demodulated at a demodulator 22. The demodulator 22 comprises a multiplier 221 and a variable frequency oscillator 222 generating an IF signal.

The frequency-converted signal is multiplied by the IF signal at multiplier 222 and a demodulated signal of the baseband is outputted therefrom.

The demodulator 22 has a phase difference detector 223 for detecting a phase difference between the output signals of the frequency-down converter and variable frequency oscillator 222. The phase difference detector 223 detects the phase difference component on the output signal of the multiplier 221 and controls the oscillating frequency of the variable frequency oscillator 222. Thus, the oscillating frequency is locked to the frequency of the output signal from the frequency-down converter.

Transmitter circuit 5 has a modulator 53 comprising a multiplier 531 and a variable frequency oscillator 532 providing an IF signal.

The digital baseband signal from decision circuit 3 is multiplied by the IF signal to modulate the IF signal. The modulated signal is applied to a frequency-up converter comprising a multiplier 54 and fixed oscillator converter 10 and is frequency converted to a transmitting carrier frequency. The resulting digital microwave signal is radiated from antenna 202.

In this embodiment, the frequency-up converter in the transmitter circuit 5 and the frequency-down converter in the receiver circuit 2 commonly use the fixed frequency oscillator 10. Therefore, if the oscillating frequencies of IF oscillators 532 and 212 are coincident with each other, the transmitter carrier frequency $f_{12}$ coincides with the receiver carrier frequency $f_{13}$.

The variable frequency oscillator 532 is controlled by a phase-lock circuit 55 which comprises a multiplier 551 for detecting a phase difference between the oscillating frequencies of IF oscillators 532 and 222. The output signal is applied to oscillator 532 through a low-pass filter 552 and controls the oscillating frequency of the variable frequency oscillator 532. Accordingly, the IF signal in the transmitter circuit 5 is locked to the IF signal in the receiver circuit 2. Thus, the transmitter carrier frequency is coincident with the receiver carrier frequency. This means that formula (1) is maintained, and the transmitter-to-receiver interference can be readily cancelled in the embodiments described above.

The circuit of FIG. 9 can be employed in embodiments as described hereinafter. Further, the circuit of FIG. 9 is directed to one transmitter receiver pair but a similar circuit can be used in various pairs of transmitter circuits and receiver circuits in the repeater.

Figure 10:
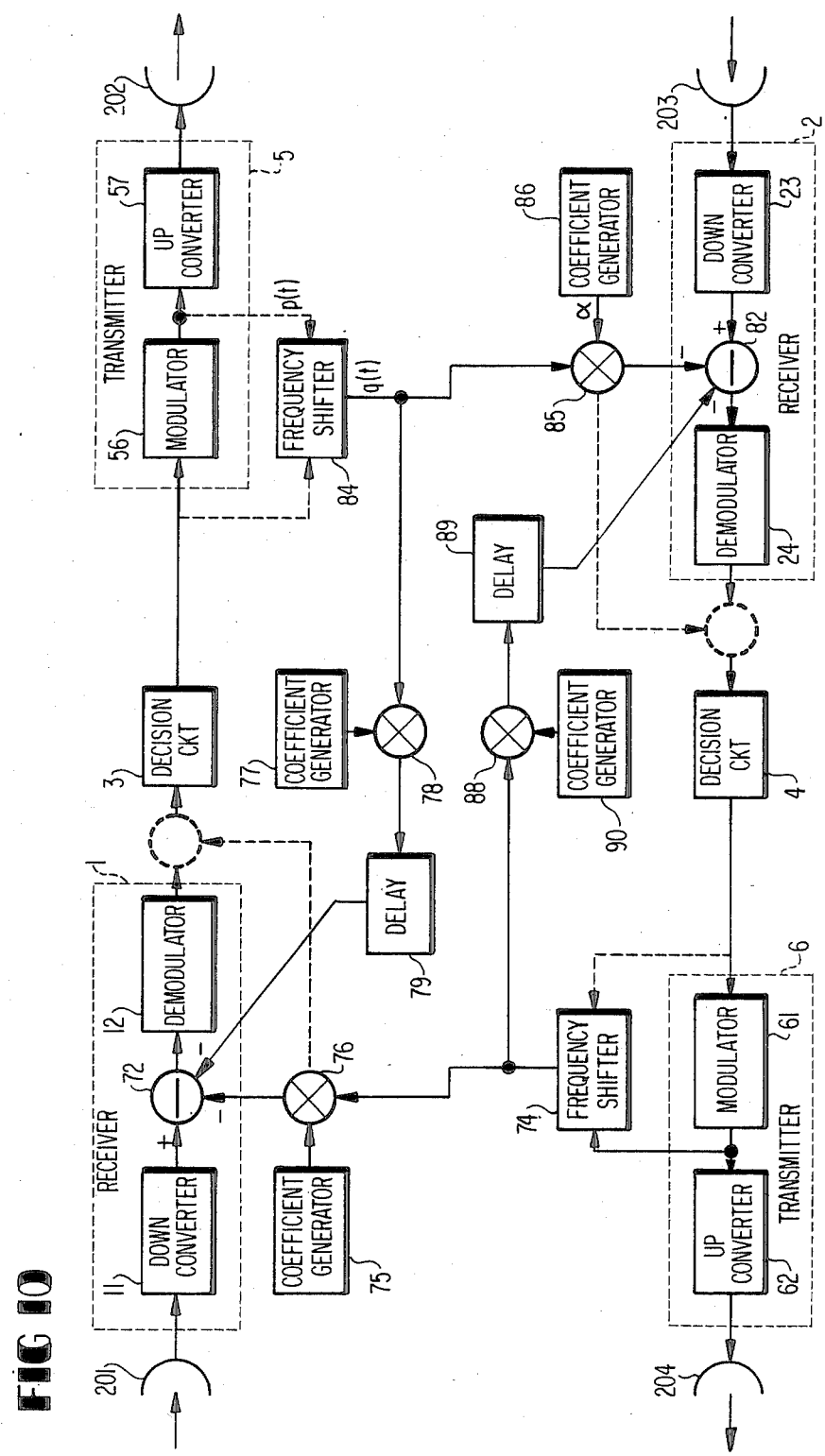
FIG. 10 is a block circuit diagram view of a repeater according to another embodiment of the present invention.

Referring to FIG. 10, shown is another embodiment which cancels the transmitter-to-receiver interference signals at the IF band. Similar parts are represented by the same reference numerals as in FIG. 5.

The transmitters 5 and 6 comprise modulators 56 and 61 for modulating the IF signal by the digital intermediate signals from decision circuits 3 and 4, and frequency-up converters 57 and 62 for converting the modulated signal to the carrier frequencies, respectively.

The receivers 1 and 2 comprise frequency-down converters 11 and 23 for down-converting the radio signals received at respective antennas to the IF frequency, and demodulators 12 and 24 for demodulating the frequency-down converted signals to extract the digital baseband signals, respectively.

In this embodiment, the IF band signal in the transmitter is used to produce a signal for removing the transmitter-to-receiver interference signal.

With respect to the cancellation of the trasmitter-to-receiver signal through transmitting antenna 201 and receiving antenna 203, the IF band signal is taken out at an intermediate point from modulator 56 and frequency-up converter 57. The IF band signal is applied to a frequency shifter 84. The frequency shifter 84 shifts the IF signal frequency by an amount by corresponding to the frequency difference between the intermediate frequencies in the transmitter 5 and the receiver 2. The frequency difference corresponds to the frequency difference between the transmitter and the receiver carrier frequencies.

Figure 11:
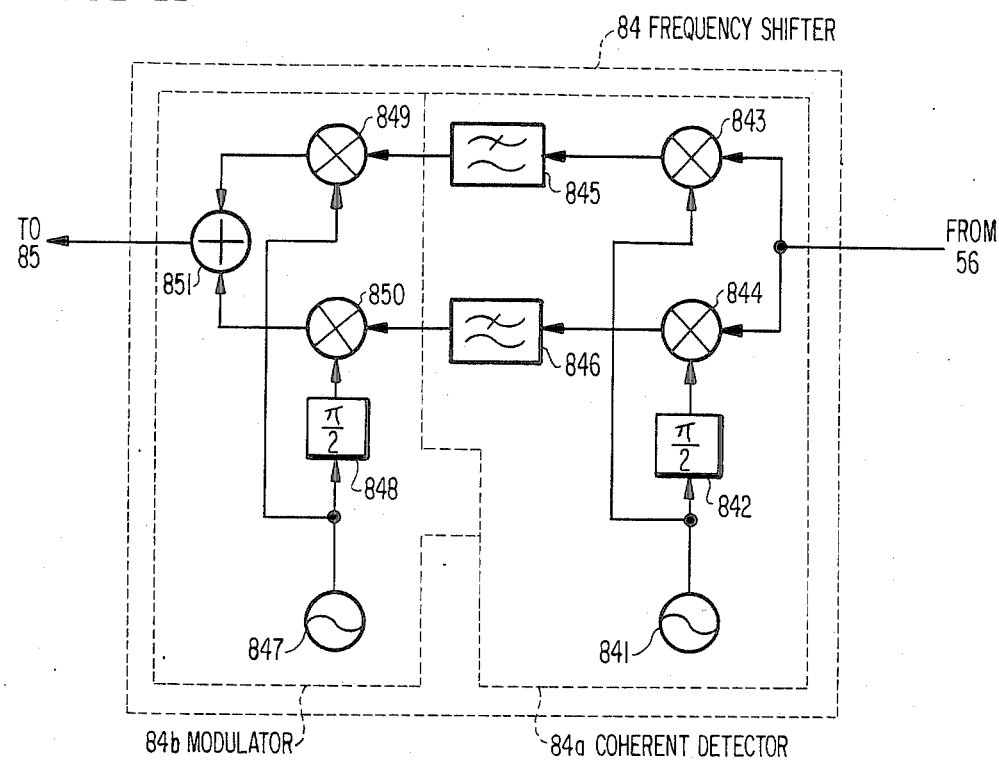
FIG. 11 is a block circuit diagram of an example of a frequency shifter used in the embodiment of FIG. 10.

Referring to FIG. 11, an example of the frequency shifter 84 is illustrated. The frequency shifter 84 comprises an oscillator 841 for providing a signal having an angular frequency $\omega_V$ and a phase shifter 842 for phase shifting the frequency signal from oscillator 841 by $\pi/2$. The output signals from oscillator 841 and phase shifter 842 are multiplied by the IF band signal from modulator 56 at multipliers 843 and 844, respectively. The multiplied signals are filtered at low-pass filters 845 and 846, respectively. The oscillator 841, phase shifter 842, multipliers 843 and 844, and low-pass filters 845 and 846 together form a coherent detector 84a. Providing that the IF band signal p(t) is given by:

$$p(t) = B_R(t)\cos\omega_{IF}t + B_I(t)\sin\omega_{IF}t \quad (4)$$
$$(B(t) = B_R(t) + jB_I(t))$$

where $\omega_{IF}$ is an angular frequency of the IF signal. The output signals from low-pass filters 845 and 846 are represented by the following single equation:

$$\gamma(t) = B(t)e^{j(\omega_{IF}-\omega_V)t}. \quad (5)$$

The output signals from low-pass filters 845 and 846 are applied to a modulator 84b. The modulator 84b comprises an generating 847 for oscillating a signal having an angular frequency $\omega_{IF}$, a phase shifter 848 for shifting a phase of the output signal of oscillator 847 by $\pi/2$, and multipliers 849 and 850 for multiplying the output signals from low-pass filters 845 and 846 by the output signals from oscillator 847 and phase shifter 850, respectively. The output signals of multipliers 849 and 850 are added to each other at an adder 851. The output (q(t)) of adder 851 is represented by:

$$q(t) = R_e\{\gamma(t)\}\cos\omega_{IF}t + I_n\{\gamma(t)\}\sin\omega_{IF}t \quad (6)$$
$$= p(t) \cdot \exp\{j(\omega_{IF} - \omega_V)t\}.$$

Therefore, if $\omega_V$ is selected to be the intermediate angular frequency in receiver 2, the IF band signal p(t) is frequency shifted at the frequency shifter 84 by the frequency difference between the IF signals of the transmitter 5 and receiver 2.

Referring to FIG. 10 again, the output of the frequency shifter 84 is multiplied by a coefficient $\alpha$ at a multiplier 85. The coefficient $\alpha$ represents the amount of the transmitter-to-receiver interference and is preset in a coefficient generator 86. The output signal $\alpha q(t)$ from multiplier 85 is applied to a subtractor 82 which is connected to an output side of frequency-down converter 23 in the receiver 2. Subtractor 82 subtracts the signal $\alpha q(t)$ from the output IF band signal of frequency-down converter 23.

If the transfer delay of the transmitter-to-receiver interference signal from antenna 201 to antenna 203 is ignored, the interference signal of the IF band in the receiver is expressed by $\alpha p(t) \exp\{j(\omega_{IF}-\omega_V)\}$. Therefore, the IF band signal r(t) in the receiver 2 is given by:

$$r(t) = \alpha p(t) \exp\{j(\omega_{IF}-\omega_V)\} + R(t) \quad (7)$$

where R(t) is the desired IF band signal at a time when the transmitter-to-receiver interference is not caused.

The output A(t) of subtractor 82 is:

$$A(t) = r(t) - \alpha \cdot q(t).$$

From equations (6) and (7), $$A(t) = \alpha \cdot p(t)\exp\{j(\omega_{IF} - \omega_V)\} + R(t) - \quad (8)$$
$$\alpha \cdot p(t)\exp\{j(\omega_{IF} - \omega_V)\}$$
$$= R(t)$$

Therefore, the transmitter-to-receiver interference signal is removed in the IF band.

The interference signal from transmitter 6 to receiver 1 is, in a similar manner, removed by a frequency shifter 74, a coefficient generator 75, a multiplier 76, and a subtractor 72.

Similarly, a transmitter-to-receiver interference signals from antennas 201 and 204 to antennas 201 and 203 are also cancelled by circuit arrangements of frequency shifters 84 and 74, multipliers 78 and 88, coefficient generators, delay circuits 79 and 89, and subtractors 72 and 83, respectively.

Delay circuits 79 and 89 correspond to the equivalent delay circuits 135 and 133 in FIG. 4. If the delays corresponding to the equivalent delay circuits 131 and 137 in FIG. 4 are not ignored, delay circuits should be connected between multiplier 85 and subtractor 82 and between multiplier 76 and subtractor 72, respectively.

In the illustrated embodiment, each of the frequency shifters 84 and 74 is commonly used for cancellation of the transmitter-to-receiver interference signals due to the front-to-back coupling and the side-to-side coupling. However, separate frequency shifters can be used for cancellation of the interference signals due to these different couplings.

If any one of transmitter-to-receiver interference signals can be ignored, the corresponding circuits for removing that component can be omitted.

In the embodiment shown in FIG. 10, the transmitter-to-receiver interference signal is cancelled in the IF band. However, if the input signal of each frequency shifter 74 and 84 is taken out from the baseband signal as illustrated by dotted lines in FIG. 10, the transmitter-to-receiver interference signal can be cancelled in the baseband. In this case, subtractors 72 and 83 must be moved to output sides of modulators 12 and 24, and the oscillating frequency difference of the oscillators 841 and 847 in FIG. 11 should be selected to be the frequency difference in the baseband corresponding to that of the microwave carrier frequencies.

In the embodiment of FIGS. 10 and 11, it is assumed that the frequency difference ($\Delta\omega = \omega_{IF} - \omega_V$) is constant. However, $\omega_{IF}$ and $\omega_V$ vary in the microwave transmission system, so that the $\Delta\omega$ is not maintained constant.

Figure 12:
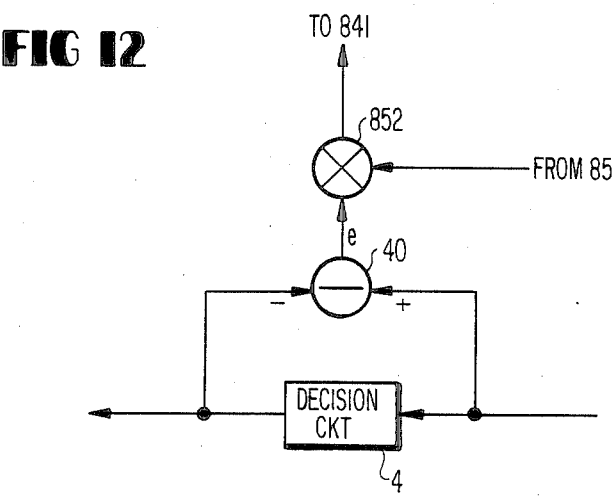
FIG. 12 is a diagram of a control circuit used for the frequency shifter of FIG. 11.

FIG. 12 shows a circuit for controlling the frequency difference between the oscillators 841 and 842 in response to variation of the actual frequency difference between IF signals in the transmitter and the receiver.

Referring to FIG. 12, an error e representative of the difference between the output signal and the input signal of decision circuit 4 is detected at a subtractor 40 similar to subtractor 60 in FIG. 8 or 91 in FIG. 6.

According to equation (2), $e = \alpha \cdot D \cdot \exp(j\Delta\omega_1)$ when no interference cancelling signal $\alpha \cdot q(t)$ is used. In case the interference cancelling signal $\alpha \cdot q(t)$ is used, $e = 0$ as will be noted from equation (8) when the phase difference ($\Delta\omega_2$) of the oscillators 841 and 847 is equal to the phase difference ($\omega_{IF} - \omega_V$) between the IF band signals in the receiver and the transmitter. If $\Delta\omega_2 \neq \omega_{IF} - \omega_V$, the interference signal ($\alpha \cdot \exp(j\Delta\omega)$) is not cancelled, the error e is given by:

$$e = D\{\alpha \cdot \exp(j\Delta\omega) - \alpha' \cdot \exp(j\Delta\omega_2 t)\}$$

where ($\alpha' \cdot D \cdot \exp(j\Delta\omega_2 t)$) is a component of the interference cancelling signal.

The error signal is applied to a multiplier 852 and is multiplied by a complex conjugate $\{\alpha' \cdot q(t)\}^*$ of the multiplier 85. The complex component of the result is expressed by $\theta_e(t) = |p(t)|^2 [\alpha \cdot \alpha' \cdot \exp\{J\Delta\omega t - \Delta\omega_1 t\}]$. Now, providing $\alpha = \cdot \exp(j\theta_I)$ and $\alpha' = a' \cdot \exp(j\theta_C)$, $$\theta_e(t) = |p(t)|^2 \cdot a \cdot a' \cdot \sin[\theta_I + \Delta\omega t - (\theta_C + \Delta\omega_e t)].$$

Namely, the multiplier 852 outputs the signal $\theta_e(t)$, and the signal $\theta_e(t)$ represents the actual difference between the phase difference of the oscillators 841 and 842 and the phase difference between the IF band signals in the transmitter and the receiver.

The multiplier output $\theta_e(t)$ is used for control of the oscillating frequency of one of the oscillators 841 and 842. Thus, the interference cancelling signal $\alpha \cdot q(t)$ is equalized to the interference signal.

The control circuit can be applied to control of the frequency shifter 74.

What is claimed is:

1. A one frequency repeater for a digital radio wave transmission system wherein a carrier is modulated by a digital baseband signal and is transmitted as a digital radio wave signal, said repeater comprising:

a first digital signal source for producing a first digital baseband signal;

transmitter circuit means coupled to said first digital signal source for producing a first digital radio wave signal modulated by said first digital baseband signal, said first digital radio wave having a first carrier frequency;

transmitting antenna means for radiating said first radio frequency signal supplied from said transmitter circuit means;

receiving antenna means for receiving a second digital radio wave signal modulated by a second digital baseband signal, said second digital radio wave signal having a second carrier frequency substantially equal to said first carrier frequency, said receiving antenna means receiving said first digital radio wave signal as a transmitter-to-receiver interference signal due to coupling between said first transmitting antenna means and said first receiving antenna means;

receiver circuit means for extracting said second digital baseband signal by demodulating said second radio wave signal received at said receiving antenna, said demodulated second digital baseband signal being accompanied by a baseband interference signal derived from said transmitter-to-receiver interference signal;

means coupled to said first digital signal source for producing an estimated-interference signal corresponding to said baseband interference signal from said first digital baseband signal, said estimated-interference signal producing means comprising transversal filter means comprising a delay line with a predetermined number of tap gains; and interference cancelling means coupled to said receiver circuit means and said estimated-interference signal producing means for cancelling said baseband interference signal from an output signal of said receiver circuit means using said estimated-interference signal to thereby produce said demodulated second digital baseband signal without said baseband interference signal;

decision circuit means for detecting said second digital baseband signal from an output of said interference cancelling means and regenerating said second digital baseband signal; and tap gain control means for controlling said tap gains, said tap gain control means comprising first subtracting means for subtracting said regenerated second digital baseband signal from said output signal of said interference cancelling means and providing a first error signal, first multiplier means for multiplying said first digital baseband signal by said first error signal and providing a multiplied signal, and low-pass filter means for smoothing said multiplied signal, said smoothed multiplied signal being supplied to said transversal filter means to control said tap gains so that said first error signal is zero.

2. A one frequency repeater as claimed in claim 1, wherein said transmitting antenna means and said receiving antenna means are disposed side by side and directed to a common direction, said transmitter-to-receiver interference signal being caused by side-to-side coupling between said transmitting and said receiving antenna means.

3. A one frequency repeater as claimed in claim 1, wherein said transmitting antenna means and said antenna receiving means are disposed on opposite sides of said repeater and directed to opposite direction, said regenerated second digital baseband signal being supplied to said transmitter circuit means as said first digital baseband signal, said transmitter-to-receiver interference signal being caused by front-to-back coupling between said transmitting and said receiving antenna means.

4. A one frequency repeater as claimed in claim 1, wherein said transmitting antenna means and said receiving antenna means are disposed side by side and directed to a common direction, said transmitter circuit means including variable frequency oscillator means for fine adjusting said first carrier frequency, said variable frequency oscillator means being controlled by an output signal of said first multiplier means so that said first carrier frequency is made equal to said second carrier frequency.

5. A one frequency repeater as claimed in claim 1, which comprises said transmitter circuit means having first variable frequency oscillator means for providing a first signal, said first signal being used to produce said first digital radio wave signal from said first digital baseband signal, said receiver circuit means having second variable frequency oscillator means for providing a second signal, said second signal being used to extract said second digital baseband signal by demodulating said received second digital radio wave signal, means for detecting from an output signal of said receiver circuit means a phase difference of said second signal from said received second digital radio wave signal, said detected phase difference being applied to said second variable frequency oscillator means for controlling said second signal, and phase comparator means for phase-comparing said second signal and said first signal and providing a second error signal, and said second error signal being applied to said first variable frequency oscillator means so that said first signal is phase-locked to said second signal.

6. A one frequency repeater as claimed in claim 1, which comprises said transmitter circuit means having first variable intermediate frequency oscillator means for providing a first intermediate frequency signal, modulating means for modulating said first intermediate frequency signal by said first digital baseband signal, and frequency-up converter means for converting said first intermediate frequency of said modulated signal to said first carrier frequency and producing said first digital radio wave signal, said receiver circuit means having frequency-down converter means for converting a second digital radio wave signal received at said receiving antenna means to a down-converted signal having a second intermediate frequency, second variable intermediate frequency oscillator means for providing a second intermediate frequency signal, and demodulating means for demodulating said down-converted signal by said second intermediate frequency signal and providing a demodulated signal, means for detecting from said demodulated signal a phase difference between said down-converted signal and said second intermediate signal, said second variable intermediate frequency oscillator means being controlled by said phase difference, and phase comparator means for phase-comparing said second intermediate signal and said first intermediate signal and providing a second error signal, said second error signal being applied to said first variable intermediate oscillator means so that said first intermediate frequency signal is phase-locked to said second intermediate signal.

7. A repeater as claimed in claim 6, which comprises fixed frequency oscillator means for providing a fixed radio frequency signal having said second carrier frequency, said frequency-up converter means comprising multiplier means for multiplying said modulated signal by said fixed radio frequency signal, and said frequency-down converter means comprising multiplier means for multiplying said second digital radio wave signal received at said receiving antenna means by said fixed radio frequency signal.

8. A one-frequency repeater for a digital radio wave transmission system wherein a carrier is modulated by a digital baseband signal and is transmitted as a digital radio wave signal, said repeater comprising:

a first digital signal source for producing a first digital baseband signal;

transmitter circuit means coupled to said first digital signal source for producing a first digital radio wave signal modulated by said first digital baseband signal, said first digital radio wave having a first carrier frequency;

transmitting antenna means for radiating said first radio frequency signal supplied from said transmitter circuit means;

receiving antenna means for receiving a second digital radio wave signal modulated by a second digital baseband signal, said second digital radio wave signal having a second carrier frequency substantially equal to said first carrier frequency, said receiving antenna means receiving said first digital radio wave signal as a transmitter-to-receiver interference signal due to coupling between said first transmitting antenna means and said first receiving antenna means;

receiver circuit means for extracting said second digital baseband signal by demodulating said second radio wave signal received at said receiving antenna, said demodulated second digital baseband signal being accompanied by a baseband interference signal derived from said transmitter-to-receiver interference signal;

means coupled to said first digital signal source for producing an estimated-interference signal corresponding to said baseband interference signal from said first digital baseband signal, said estimated-interference signal producing means comprising: first local oscillator means for generating a first frequency signal; first phase shifter means for phase-shifting by $\pi/2$ said first frequency signal; first multiplier means for multiplying said first digital baseband signal by said first frequency signal; second multiplier means for multiplying said first digital baseband signal by said phase-shifted first frequency signal; second local oscillator means for generating a second frequency signal, said first and second frequency signals having a frequency difference corresponding to a frequency difference between said first and second carrier frequencies; second phase shifter means for phase-shifting by $\pi/2$ said second frequency signal; third multiplier means for multiplying an output from said first multiplier means by said second frequency signal; fourth multiplier means for multiplying an output from said second multiplier means by said phase-shifted second frequency signal; adder means for adding an output signal of said third multiplier means and an output signal of said fourth multiplier means; coefficient generating means for generating a coefficient representing an amount of said transmitter-to-receiver interference; and fifth multiplier means for multiplying an output signal of said adder means by said coefficient, said fifth multiplier means providing said estimated-interference signal; and interference cancelling means coupled to said receiver circuit means and said estimated-interference signal producing means for cancelling said baseband interference signal from an output signal of said receiver circuit means using said estimated-interference signal to thereby produce said demodulated second digital baseband signal without said baseband interference signal.

9. A one frequency repeater as claimed in claim 8, which further comprises delay means connected to said fifth multiplier means and for delaying said estimated-interference signal by a time period equal to a propagating time of said first digital radio wave signal from said transmitting antenna to said receiving antenna means.

10. A one frequency repeater as claimed in claim 8 which further comprises decision circuit means for deciding said second digital baseband signal from an output signal of said interference cancelling means and regenerating said second digital baseband signal, first subtracting means for subtracting said regenerated second digital baseband signal from said output signal of said interference cancelling means and providing an error signal, sixth multiplier means for multiplying said error signal by said estimated-interference signal and providing a frequency control signal, one of said first and second local oscillator means being variable oscillator means, said variable oscillator means being controlled by said frequency control signal.

11. A one-frequency repeater as claimed in claim 8, wherein said transmitter circuit means includes first variable frequency oscillator means for providing a first signal, said first signal being used to produce said first digital radio wave signal from said first digital baseband signal, said receiver circuit means including second variable frequency oscillator means for providing a second signal, said second signal being used to extract said second digital baseband signal by demodulating said received second digital radio wave signal, means for detecting from an output signal of said receiver circuit means a phase difference between said second signal and said received second digital radio wave signal, said detected phase difference being applied to said second variable frequency oscillator means to control the generation of said second signal, and phase comparator means for phase-comparing said second signal and said first signal and for providing an error signal, said error signal being applied to said first variable frequency oscillator means so that said first signal is phase-locked to said second signal.

12. A one-frequency repeater as claimed in claim 8, wherein said transmitter circuit means includes first variable intermediate frequency oscillator means for providing a first intermediate frequency signal, modulating means for modulating said first intermediate frequency signal by said first digital baseband signal, and frequency up converter means for converting said first intermediate frequency of said modulated signal to said first carrier frequency and for producing said first digital radio wave signal, said receiver circuit means including frequency down converter means for converting a second digital radio wave signal received at said receiving antenna means to a down-converted signal having a second intermediate frequency, second variable intermediate frequency oscillator means for providing a second intermediate frequency signal, and demodulating means for demodulating said down-converted signal by said second intermediate frequency signal and for providing a demodulated signal, means for detecting from said demodulated signal a phase difference between said down-converted signal and said second intermediate frequency signal, said second variable intermediate frequency oscillator means being controlled by said phase difference, and phase comparator means for phase-comparing said second intermediate frequency signal and said first intermediate frequency signal and providing an error signal, said error signal being applied to said first variable intermediate frequency oscillator means so that said first intermediate frequency signal is phase-locked to said second intermediate frequency signal.

13. A repeater as claimed in claim 8, further comprising fixed frequency oscillator means for providing a fixed radio frequency signal having said second carrier frequency, said frequency-up converter means comprising multiplier means for multiplying said modulated signal by said fixed radio frequency signal, and said frequency-down converter means comprising multiplier means for multiplying said second digital radio wave signal received at said receiving antenna means by said fixed radio frequency signal.

14. A one-frequency two-way repeater for a digital transmission system wherein first and second digital microwave signals are received at first and second receiving antenna means and regenerated as third and fourth digital microwave signals, respectively, said third and fourth digital microwave signals being radiated from first and second transmitting antenna means, respectively, said first and second digital microwave signals carrying first and second digital baseband signals, respectively, said first, second, third and fourth digital microwave signals having a first, a second, a third and a fourth carrier frequency, respectively, said first, second, third and fourth carrier frequencies being substantially equal to one another, said repeater comprising:

said first receiving antenna means and said second transmitting antenna means being disposed side by side and directed in a common first direction, said first receiving antenna means and said second antenna means having a side-to-side antenna coupling whereby said first receiving antenna means receives said fourth digital microwave signal as a first transmitter-to-receiver interference signal;

said first transmitting antenna means and said second receiving antenna means being disposed side by said and directed in a common second direction opposite to said first direction, said first transmitting antenna means and said second receiving antenna means having a side-to-side antenna coupling whereby said second receiving antenna means receives said third digital microwave signal as a second transmitter-to-receiver interference signal;

first receiver circuit means connected to said first receiving antenna means for extracting said first digital baseband signal by demodulating said first digital microwave signal received at said first receiving antenna means, said demodulated first digital baseband signal being accompanied by a first baseband interference signal derived from said first transmitter-to-receiver interference signal;

first decision circuit means for detecting said demodulated first digital baseband signal and regenerating said first digital baseband signal as a third digital baseband signal;

first transmitter circuit means for producing said third digital microwave signal modulated by said third digital baseband signal and for supplying said third digital microwave signal to said first transmitting antenna means;

second receiver circuit means connected to said second receiving antenna means and for extracting said second digital baseband signal by demodulating said second digital microwave signal received at said second receiving antenna means, said demodulated second digital baseband signal being accompanied by a second baseband interference signal derived from said second transmitter-to-receiver interference signal;

second decision circuit means for detecting said demodulated second digital baseband signal and regenerating said second digital baseband signal as a fourth digital baseband signal;

second transmitter circuit means for producing said fourth digital microwave signal modulated by said fourth digital baseband signal and for supplying said fourth digital microwave signal to said second transmitting antenna means;

first estimated-interference signal producing means coupled to said second decision circuit means for producing a first estimated-interference signal corresponding to said first baseband interference signal from said fourth digital baseband signal, said first estimated-interference signal producing means comprising transversal filter means comprising a delay line having a predetermined number of tap gains;

first interference cancelling means coupled to said first estimated-interference signal producing means for cancelling said first baseband interference signal from an output signal of said first receiver circuit means using said first estimated-interference signal, to thereby obtain said demodulated first digital baseband signal without said first baseband interference signal;

second estimated-interference signal producing means coupled to said first decision circuit means for producing a second estimated-interference signal corresponding to said second baseband interference signal from said third digital baseband signal; and second interference cancelling means coupled to said second estimated-interference signal producing means for cancelling said second baseband interference signal from an output signal of said second receiver circuit means using said second estimated-interference signal, to thereby obtain said demodulated second digital baseband signal without said second baseband interference signal.

15. A repeater as claimed in claim 14, wherein said second estimated-interference signal producing means comprises a transversal filter means comprising a delay line with a predetermined number of tap gains.

16. A repeater as claimed in claim 14, which further comprises said first receiving antenna means and said first transmitting antenna means having a front-to-back antenna coupling so that said third digital microwave signal is received at said first receiving antenna means as a third transmitter-to-receiver interference signal, said first receiver circuit means providing an output signal with a third baseband interference signal derived from said third transmitter-to-receiver interference signal, third estimated-interference signal producing means for producing a third estimated-interference signal corresponding to said third baseband interference signal from said third digital baseband signal, said third estimated-interference signal being applied to said baseband signal, said first interference cancelling means so that said third baseband interference signal is cancelled from said output signal of said first receiver circuit means.

17. A repeater as claimed in claim 16, which further comprises said second receiving antenna means and said second transmitting antenna means having a front-to-back antenna coupling so that said fourth digital microwave signal is received at said second receiving antenna means as a fourth transmitter-to-receiver interference signal, said second receiver circuit means providing an output signal with a fourth baseband interference signal derived from said fourth transmitter-to-receiver interference signal, fourth estimated-interference signal producing means for producing a fourth estimated-interference signal corresponding to said fourth baseband interference signal from said fourth digital baseband signal, said fourth estimated-interference signal being applied to said second interference cancelling means so that said fourth baseband interference signal is cancelled from said output signal of said second receiver circuit means.

18. A repeater as claimed in claim 17, wherein said third estimated-interference signal producing means is first transversal filter means comprising a delay line with a predetermined number of tap gains, and said fourth estimated-interference signal producing means is second transversal filter means comprising a delay line with a predetermined number of tap gains.

19. A repeater as claimed in claim 16, wherein said third estimated-interference signal producing means comprises: first local oscillator means for oscillating a first frequency signal; first phase shifter means for phase-shifting by $\pi/2$ said first frequency signal; first multiplier means for multiplying said third digital baseband signal by said first frequency signal; second multiplier means for multiplying said third digital baseband signal by said phase-shifted first frequency signal; second local oscillator means for oscillating a second frequency signal, said first and second frequency signals having a frequency difference corresponding to a frequency difference between said first and third carrier frequencies; second phase shifter means for phase-shifting by $\pi/2$ said second frequency signal; third multiplier means for multiplying an output from said first multiplier means by said second frequency signal; fourth multiplier means for multiplying an output from said second multiplier means by said phase-shifted second frequency signal; adder means for adding an output signal of said third multiplier means and an output signal of said fourth multiplier means; coefficient generating means for generating a coefficient representing an amount of said third transmitter-to-receiver interference; fifth multiplier means for multiplying an output signal of said adder means by said coefficient, said fifth multiplier means providing said third estimated-interference signal; and delay means being connected to said fifth multiplier means and for delaying said third estimated-interference signal by a time equal to a propagation time of said third digital radio wave signal from said first transmitting antenna means to said first receiving antenna means.

20. A repeater as claimed in claim 17, wherein said fourth estimated-interference signal producing means comprises; first local oscillator means for oscillating a first frequency signal; first phase shifter means for phase-shifting by $\pi/2$ said first frequency signal; first multiplier means for multiplying said fourth digital baseband signal by said first frequency signal; second multiplier means for multiplying said fourth digital baseband signal by said phase-shifted first frequency signal; second local oscillator means for oscillating a second frequency signal, said first and second frequency signals having a frequency difference equal to a frequency difference between said second and fourth carrier frequencies; second phase shifter means for phase-shifting by $\pi/2$ said second frequency signal; third multiplier means for multiplying an output from said first multiplier means by said second frequency signal; fourth multiplier means for multiplying an output from said second multiplier means by said phase-shifted second frequency signal; adder means for adding an output signal of said third multiplier means and an output signal of said fourth multiplier means; coefficient generating means for generating a coefficient representing an amount of said fourth transmitter-to-receiver interference; fifth multiplier means for multiplying an output signal of said adder means by said coefficient, said fifth multiplier means providing said fourth estimated-interference signal; and delay means connected to said fifth multiplier means and for delaying said fourth estimated-interference signal by a time equal to a propagation time of said fourth digital microwave signal from said second transmitting antenna means to said second receiving antenna means.

21. A one-frequency two-way repeater for a digital transmission system wherein first and second digital microwave signals are received at first and second receiving antenna means and regenerated as third and fourth digital microwave signals, respectively, said third and fourth digital microwave signals being radiated from first and second transmitting antenna means, respectively, said first and second digital microwave signals carrying a first and a second digital baseband signal, respectively, said first, second, third and fourth digital microwave signals having first, second, third and fourth carrier frequencies, respectively, said first, second, third and fourth carrier frequencies beinbg substantially equal to one another said repeater comprising:

said first receiving antenna means and said second transmitting antenna means being disposed side by side and directed in a common first direction, said first receiving antenna means and said second antenna means having a side-to-side antenna coupling whereby said first receiving antenna means receives said fourth digital microwave signal as a first transmitter-to-receiver interference signal;

said first transmitting antenna means and said second receiving antenna means being disposed side by side and directed in a common second direction opposite to said first direction, said first transmitting antenna means and said second receiving antenna means having a side-to-side antenna coupling whereby said second receiving antenna means receives said third digital microwave signal as a second transmitter-to-receiver interference signal;

first receiver circuit means connected to said first receiving antenna means for extracting said first digital baseband signal by demodulating said first digital microwave signal received at said first receiving antenna means, said demodulated first digital baseband signal being accompanied by a first baseband interference signal derived from said transmitter-to-receiver interference signal;

first decision circuit means for detecting said demodulated first digital baseband signal and regenerating said first digital baseband signal as a third digital baseband signal;

first transmitter circuit means for producing said third digital microwave signal modulated by said third digital baseband signal and for supplying said third digital microwave signal to said first transmitting antenna means;

second receiver circuit means connected to said second receiving antenna means for extracting said second digital baseband signal by demodulating said second digital microwave signal received by said second receiving antenna means, said demodulated second digital baseband signal being accompanied by a second baseband interference signal derived from said second transmitter-to-receiver interference signal;

second decision circuit means for detecting said demodulated second digital baseband signal and regenerating said second digital baseband signal as a fourth digital baseband signal;

second transmitter circuit means for producing said fourth digital microwave signal modulated by said fourth digital baseband signal and for supplying said fourth digital microwave signal to said second transmitting antenna means;

first estimated-interference signal producing means coupled to said second decision circuit means for producing a first estimated-interference signal corresponding to said first baseband interference signal from said fourth digital baseband signal, said first estimated-interference signal producing means comprising: first local oscillator means for generating a first frequency signal; first phase shifter means for phase-shifting by $\pi/2$ said first frequency signal; first multiplier means for multiplying said fourth digital baseband signal by said first frequency signal; second multiplier means for multiplying said fourth digital baseband signal by said phase-shifted first frequency signal; second local oscillator means for generating a second frequency signal, said first and second frequency signals having a frequency difference corresponding to a frequency difference between said first and fourth carrier frequencies; second phase shifter means for phase-shifting by $\pi/2$ said second frequency signal; third multiplier means for multiplying an output from said first multiplier means by said second frequency signal; fourth multiplier means for multiplying an output from said second multiplier means by said phase-shifted second frequency signal; first adder means for adding an output signal of said third multiplier means and an output signal of said fourth multiplier means; first coefficient generating means for generating a first coefficient representing the amount of said first transmitter-to-receiver interference; and fifth multiplier means for multiplying an output signal of said adder means by said first coefficient, said fifth multiplier means providing said first estimated-interference signal;

first interference cancelling means coupled to said first estimated-interference signal producing means for cancelling said first baseband interference signal from an output signal of said first receiver circuit means using said first estimated-interference signal, to thereby obtain said demodulated first digital baseband signal without said first baseband interference signal;

second estimated-interference signal producing means coupled to said first decision circuit means for producing a second estimated-interference signal, corresponding to said second baseband interference signal, from said third digital baseband signal; and second interference cancelling means coupled to said second estimated-interference signal producing means for cancelling said second baseband interference signal from an output signal of said second receiver circuit means using said second estimated-interference signal, to thereby obtain said demodulated second digital baseband signal without said second baseband interference signal.

22. A repeater as claimed in claim 21, wherein said second estimated-interference signal producing means comprises; third local oscillator means for generating a third frequency signal; third phase shifter means for phase-shifting by $\pi/2$ said third frequency signal; sixth multiplier means for multiplying said third digital baseband signal by said third frequency signal; seventh multiplier means for multiplying said third digital baseband signal by said phase-shifted third frequency signal; fourth local oscillator means for generating a fourth frequency signal, said third and fourth frequency signals having a frequency difference equal to a frequency difference between said second and third carrier frequencies; fourth phase shifter means for phase-shifting by $\pi 2$ said fourth frequency signal; eighth multiplier means for multiplying an output from said sixth multiplier means by said fourth frequency signal; ninth multiplier means for multiplying an output from said seventh multiplier means by said phase-shifted fourth frequency signal; second adder means for adding an output signal of said eighth multiplier means and an output signal of said ninth multiplier means; second coefficient generating means for generating a second coefficient representing the amount of said second transmitter-to-receiver interference; and tenth multiplier means for multiplying an output signal of said second adder means by said second coefficient, said tenth multiplier means providing said second estimated-interference signal.

23. A one-frequency repeater for a digital radio wave transmission system wherein a carrier is modulated by a digital baseband signal and is transmitted as a digital radio wave signal, said repeater comprising:

first transmitter circuit means comprising first modulating means for modulating a first intermediate frequency signal by a first digital baseband signal and providing a first modulated signal, and first frequency up converter means for converting a frequency of said first modulated signal to a first carrier frequency and providing a first digital radio wave signal;

first transmitting antenna means for radiating said first digital radio wave signal;

first receiving antenna means for receiving a second digital radio wave signal modulated by a second digital baseband signal, said second digital radio wave signal having a second carrier frequency substantially equal to said first carrier frequency, said first receiving antenna means receiving said first digital radio wave signal as a first transmitter-to-receiver interference signal due to coupling between said first transmitting antenna means and said first receiving antenna means;

first receiver circuit means comprising frequency down converter means for converting a frequency of a radio wave signal received at said first receiving antenna means to a second intermediate frequency slightly different from said first intermediate frequency, said frequency down converter means providing a first digital intermediate frequency signal, said first digital intermediate frequency signal having a first signal component derived from said second digital radio wave signal and a first interference signal derived from said first transmitter-to-receiver interference signal;

first frequency shifter means for frequency-shifting said first modulated signal from said first modulating means by a frequency difference of said first and second intermediate frequencies and providing a first frequency-shifted signal, said first frequency shifter means comprising: first local oscillator means for generating a first local signal having a frequency equal to one of said first and second intermediate frequencies; first phase shifter means for phase-shifting by $\pi/2$ said first local signal; second multiplier means for multiplying said first modulated signal by said first local signal; third multiplier means for multiplying said first modulated signal by said phase-shifted first local signal; first low-pass filter means connected to an output of said second multiplier means; second low-pass filter means connected to an output of said third multiplier means; second local oscillator means for generating a second local signal having a frequency equal to the other of said first and second intermediate frequencies; second phase shifter means for phase-shifting by $\pi/2$ said second local signal; fourth multiplier means for multiplying an output from said first low-pass filter means by said second local signal; fifth multiplier means for multiplying an output from said second low-pass filter means by said phase-shifted second local signal; and first adder means for adding an output signal of said fourth multiplier means and an output signal of said fifth multiplier means, said first adder means providing said first frequency-shifted signal;

first coefficient generating means for generating a first coefficient representing an amount of said first transmitter-to-receiver interference;

sixth multiplier means coupled to said first frequency shifter means and said first coefficient generating means for multiplying said first frequency-shifted signal by said first coefficient and providing a first interference-removing signal; and first interference cancelling means coupled to said frequency down converter means and said sixth multiplier means for cancelling said first interference signal from said first digital intermediate signal using said first interference-removing signal.

24. A one frequency repeater as claimed in claim 23, wherein said first transmitting antenna means and said first receiving antenna means are disposed side by side and directed to a common direction, said first transmitter-to-receiver interference signal being caused by side-to-side coupling between said first transmitting and said first receiving antenna means.

25. A one frequency repeater as claimed in claim 23, wherein said first transmitting antenna means and said first receiving antenna means are disposed on opposite sides of said repeater and directed to opposite direction, said first transmitter-to-receiver interference signal being caused by front-to-back coupling between said first transmitting and said first receiving antenna means, said first receiver circuit means further comprising first demodulating means for demodulating an output of said first interference cancelling means and extracting said second digital baseband signal, first decision circuit means for deciding said second digital baseband signal from an output of said first demodulating means and regenerating said second digital baseband signal, said regenerated second digital baseband signal being supplied to said first transmitter circuit means as said first digital baseband signal.

26. A repeater as claimed in claim 25, which further comprises: second transmitter circuit means comprising second modulating means for modulating a third intermediate frequency signal by a third digital baseband signal and providing a second modulated signal, said second and third intermediate frequency signals having a frequency difference and second frequency-up converter means for converting a frequency of said second modulated signal to a third carrier frequency substantially equal to said second carrier frequency and providing a third digital radio wave signal; second transmitting antenna means for radiating said third digital radio wave signal, said second transmitting antenna means and said first receiving antenna means being disposed side by side and directed in a common direction, said radiated third digital radio wave signal being received at said first receiving antenna means as a second transmitter-to-receiver interference signal due to a side-by-side antenna coupling between said second transmitting antenna means and said first receiving antenna means; said frequency-down converter means providing said first digital intermediate frequency signal, said first digital intermediate frequency said further having a second interference signal derived from said second transmitter-to-receiver interference signal; second frequency shifter means for frequency shifting said second modulated signal from said second modulating means by the frequency difference of said second and third intermediate frequencies and providing a second frequency-shifted signal; second coefficient generating means for generating a second coefficient representing an amount of said second transmitter-to-receiver interference; seventh multiplier means for multiplying said second frequency-shifted signal by said second coefficient and providing a second interference-removing signal, said second interference-removing signal being supplied to said first interference cancelling means so that said second interference signal is cancelled from said first digital intermediate signal.

27. A one-frequency repeater as claimed in claim 26, wherein said second frequency shifter means comprises: third local oscillator means for generating a third local signal having a frequency equal to one of said second and third intermediate frequencies; third phase shifter means for phase-shifting by $\pi/2$ said third local signal; eighth multiplier means for multiplying said second modulated signal by said third local signal; ninth multiplier means for multiplying said second modulated signal by said phase-shifted third local signal; third low-pass filter means connected to an output of said eighth multiplier means, fourth low-pass filter means connected to an output of said ninth multiplier means; fourth local oscillator means for generating a fourth local signal having a frequency equal to the other of said second and third intermediate frequencies; fourth phase shifter means for phase-shifting by $\pi/2$ said fourth local signal; tenth multiplier means for multiplying an output from said third low-pass filter means by said fourth local signal; eleventh multiplier means for multiplying an output from said fourth low-pass filter means by said phase-shifted fourth local signal; and second adder means for adding an output signal of said tenth multiplier means and an output signal of said eleventh multiplier means, said second adder means providing said second frequency-shifted signal.

28. A frequency repeater as claimed in claim 25, which further comprises delay means being connected to said sixth multiplier means and for delaying said first interference-removing signal by a time equal to a propagation time of said first digital radio wave signal from said first transmitting antenna means and said first receiving antenna means.

29. A one frequency repeater as claimed in claim 23, which comprises said first receiver circuit means further comprising first demodulating means for demodulating an output of said first interference cancelling means and extracting said second digital baseband signal, first decision circuit means for deciding said second digital baseband signal from an output signal of said first demodulating means and regenerating said second digital baseband signal, first subtracting means for subtracting said regenerated second digital baseband signal from said output signal of said first demodulating means and providing an error signal, seventh multiplier means for multiplying said error signal by said first interference-removing signal and providing a frequency control signal, one of said first and second local oscillator means being variable oscillator means, said variable oscillator means being controlled by said frequency control signal.

30. A one frequency repeater as claimed in claim 23, which comprises said first transmitter circuit means having first variable intermediate frequency oscillator means for providing said first intermediate frequency signal, said receiver circuit means having second variable intermediate frequency oscillator means for providing a second intermediate frequency signal, and demodulating means for demodulating said first digital intermediate frequency signal by said second intermediate frequency signal and providing a demodulated signal, means for detecting from said demodulated signal a phase difference between said first digital intermediate frequency signal and said second intermediate signal, said second variable intermediate frequency oscillator means being controlled by said phase difference, and phase comparator means for phase-comparing said second intermediate signal and said first intermediate signal and providing an error signal, said error signal being applied to said first variable intermediate oscillator means so that said first intermediate frequency signal is phase-locked to said second intermediate signal.

31. A repeater as claimed in claim 30, which comprises fixed frequency oscillator means for providing a fixed radio frequency signal having said second carrier frequency, said first frequency-up converter means comprising multiplier means for multiplying said first modulated signal by said fixed radio frequency signal, and said frequency-down converter means comprising multiplier means for multiplying said second digital radio wave signal received at said receiving antenna means by said fixed radio frequency signal.

32. A one-frequency repeater for a cochannel dual polarization transmission system wherein two independent digital baseband signals are carried by orthogonally related paired waves of a single carrier frequency signal, said repeater comprising:

first and second signal sources for generating first and second digital baseband signals, respectively;

first transmitter circuit means coupled to said first and second signal sources for producing a first pair of horizontally and vertically polarized waves of a first carrier frequency which carry said first and said second digital baseband signals;

first transmitting antenna means for radiating said first pair of horizontally and vertically polarized waves;

first receiving antenna means for receiving a second pair of horizontally and vertically polarized waves of a second carrier frequency which carry a third and a fourth digital baseband signal; said second carrier frequency being substantially equal to said first carrier frequency means, said first pair of horizontally and vertically polarized waves being received at said first receiving antenna means as a first transmitter-to-receiver interference signal due to a coupling between said first transmitting antenna means and said second receiving antenna means;

receiver circuit means comprising first and second demodulating means for independently modulating said second horizontally polarized wave signal and said second vertically polarized wave signal and extracting said third digital baseband signal and said fourth baseband signal, respectively, said extracted third digital baseband signal being accompanied by a first interference signal and a second interference signal caused by said first transmitter-to-receiver interference signal, said extracted fourth digital baseband signal being accompanied by a third interference signal and a fourth interference signal caused by said first transmitter-to-receiver interference signal;

first estimated-interference signal producing means coupled to said first signal source for producing a first estimated-interference signal corresponding to said first interference signal from said first digital baseband signal;

second estimated-inteference signal producing means coupled to said second signal source for producing a second estimated-interference signal corresponding to said second interference signal from second digital baseband signal;

first interference cancelling means coupled to said first and second estimated-interference signal producing means for cancelling said first and second interference signal from an output of said first modulating means using said first and second estimated-interference signals;

third estimated-interference signal producing means coupled to said first signal source for producing a third estimated-interference signal corresponding to said third interference signal from said first digital baseband signal;

fourth estimated-interference signal producing means coupled to said second signal source for producing a fourth estimated-interference signal corresponding to said fourth interference signal from said second baseband signal; and second interference cancelling means coupled to said third and fourth estimated-interference signal producing means for cancelling said third and fourth interference signals from an output of said second demodulating means using said third and fourth estimated-interference signals.

33. A one frequency repeater as claimed in claim 32, wherein each of said first to fourth estimated-interference signal producing means is a transversal filter means comprising a delay line with a predetermined number of tap gains.

34. A one frequency repeater as claimed in claim 32, wherein said first transmitting antenna means and said first receiving antenna means are disposed side by side and directed to a common direction, said first transmitter-to-receiver interference signal being caused by a side-to-side coupling between said first transmitting and said first receiving antenna means.

35. A one frequency repeater as claimed in claim 32, which further comprises first decision circuit means for deciding said third digital baseband signal from an output of said first interference cancelling means and regenerating said third digital baseband signal, second decision circuit means for deciding said fourth digital baseband signal from an output of said second interference cancelling means and regenerating said fourth digital baseband signal, said regenerated third and fourth digital baseband signals being supplied to said first transmitter circuit means as said first and second digital baseband signals, said transmitting antenna means and said receiving antenna means being disposed on opposite sides of said repeater and directed to opposite directions, said first transmitter-to-receiver interference signal being caused by front-to-back coupling between said first tranmitting and said first receiving antenna means.

36. A one frequency repeater as claimed in claim 35, which further comprises: second transmitter circuit means for producing a third pair of horizontally and vertically polarized means of a third carrier frequency substantially equal to said second carrier frequency; second transmitting antenna means for radiating said third pair of said horizontally and vertically polarized waves, said second transmitting antenna means and said first receiving antenna means being disposed side by side and directed in a common direction, said radiated third pair of polarized waves being received at said first receiving antenna means as a second transmitter-to-receiver interference signal due to a side-to-side antenna coupling between said second transmitting antenna means and said first receiving antenna means; said first and second demodulating means demodulating said second transmitter-to-receiver interference signal whereby said extracted third digital baseband signal being further accompanied with a fifth interference signal and a sixth interference signal while said extracted fourth digital baseband signal being further accompanied with a seventh interference signal and an eighth interference signal; fifth estimated-interference signal producing means for producing a fifth estimated-interference signal corresponding to said fifth interference signal from said fifth digital baseband signal, said fifth estimated-interference signal being supplied to said first interference cancelling means so that said fifth interference signal is cancelled; sixth estimated-interference signal producing means for producing sixth estimated-interference signal corresponding to said sixth interference signal from said sixth digital baseband signal, said sixth estimated-interference signal being supplied to said first interference cancelling means so that said sixth interference signal is cancelled; seventh estimated-interference signal producing means for producing a seventh estimated-interference signal corresponding to said seventh interference signal from said fifth digital baseband signal, said seventh estimated-interference signal being supplied to said second interference cancelling means so that said seventh interference signal is cancelled; and eighth estimated-interference signal producing means for producing eithth estimated-interference signal corresponding to said eighth interference signal from said sixth digital baseband signal, said eighth estimated-interference signal being supplied to said second interference cancelling means so that said eighth interference signal is cancelled.

37. A one frequency repeater as claimed in claim 36, wherein each one of said fifth to eighth estimated-interference signal producing means is a transversal filter means comprising a delay line with a predetermined number of tap gains.

* * * * *

UNITED STATES PATENT AND TRADEMARK OFFICE
CERTIFICATE OF CORRECTION

PATENT NO. : 4,701,935
DATED : October 20, 1987
INVENTOR(S) : Junji Namiki

It is certified that error appears in the above-identified patent and that said Letters Patent is hereby corrected as shown below:

Column 1, line 44, after "frequency" delete "plan"
Column 11, line 48, delete "trasmitter" insert --transmitter--.
Column 12, line 18, after "an" delete "generating" insert --oscillator--; after "for" delete "oscillating" insert --generating--.
Column 18, line 44, Claim 13, delete "8" insert --12--.
Column 19, line 40, delete "at" and insert --by--.
Column 22, line 6, delete "beinbg" and insert --being--.
Column 25, line 66, delete "said" and insert --signal--.

Signed and Sealed this

Twenty-sixth Day of July, 1988

Attest:

DONALD J. QUIGG

Attesting Officer

Commissioner of Patents and Trademarks